(12) United States Patent  (10) Patent No.: US 9,179,515 B2
Aizawa  (45) Date of Patent: Nov. 3, 2015

(54) DRIVER CIRCUIT FOR LED BACKLIGHT OF LIQUID CRYSTAL DISPLAY DEVICE

(71) Applicant: FANUC Corporation, Yamanashi (JP)

(72) Inventor: Yasuharu Aizawa, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 14/257,037

(22) Filed: Apr. 21, 2014

(65) Prior Publication Data
US 2014/0312800 A1  Oct. 23, 2014

(30) Foreign Application Priority Data
Apr. 22, 2013 (JP) .................................. 2013-089598

(51) Int. Cl.
H05B 37/02 (2006.01)
H05B 33/08 (2006.01)

(52) U.S. Cl.
CPC ........ H05B 33/0848 (2013.01); H05B 33/0803 (2013.01)

(58) Field of Classification Search
CPC .... H05B 37/02; H05B 33/08; H05B 33/0803; H05B 33/0833; H05B 33/0848
USPC ...................... 315/209 R, 291, 307, 308, 312
See application file for complete search history.

(56) References Cited

U.S. PATENT DOCUMENTS 8,643,289 B2 * 2/2014 Ryu et al. ........................ 315/186
2010/0164922 A1 * 7/2010 Nose et al. ..................... 345/207

FOREIGN PATENT DOCUMENTS

JP  2007-258459 A  10/2007
JP  2008-210537 A  9/2008
JP  2010-135112 A  6/2010
JP  2011-150981 A  8/2011

OTHER PUBLICATIONS

Office Action mailed Sep. 30, 2014, corresponding to Japanese patent application No. 2013-089598.
Office Action mailed Jan. 27, 2015, corresponding to Japanese patent application No. 2013-089598.

* cited by examiner

*Primary Examiner* — Jimmy Vu
(74) *Attorney, Agent, or Firm* — Hauptman Ham, LLP

(57) ABSTRACT

A driver circuit driving an LED backlight of a liquid crystal display device includes a determination unit and a drive current output unit that receives a luminance adjustment signal from the determination unit and supplies a drive current to the LED backlight. The determination unit determines whether or not a duty ratio of a PWM signal input from a control circuit satisfies a predetermined value set in advance and outputs a luminance adjustment signal set in advance in a case where the input of the PWM signal does not reach the predetermined value and outputs a luminance adjustment signal corresponding to the PWM signal input from the control circuit in a case where the input of the PWM signal is the predetermined value or more.

4 Claims, 4 Drawing Sheets

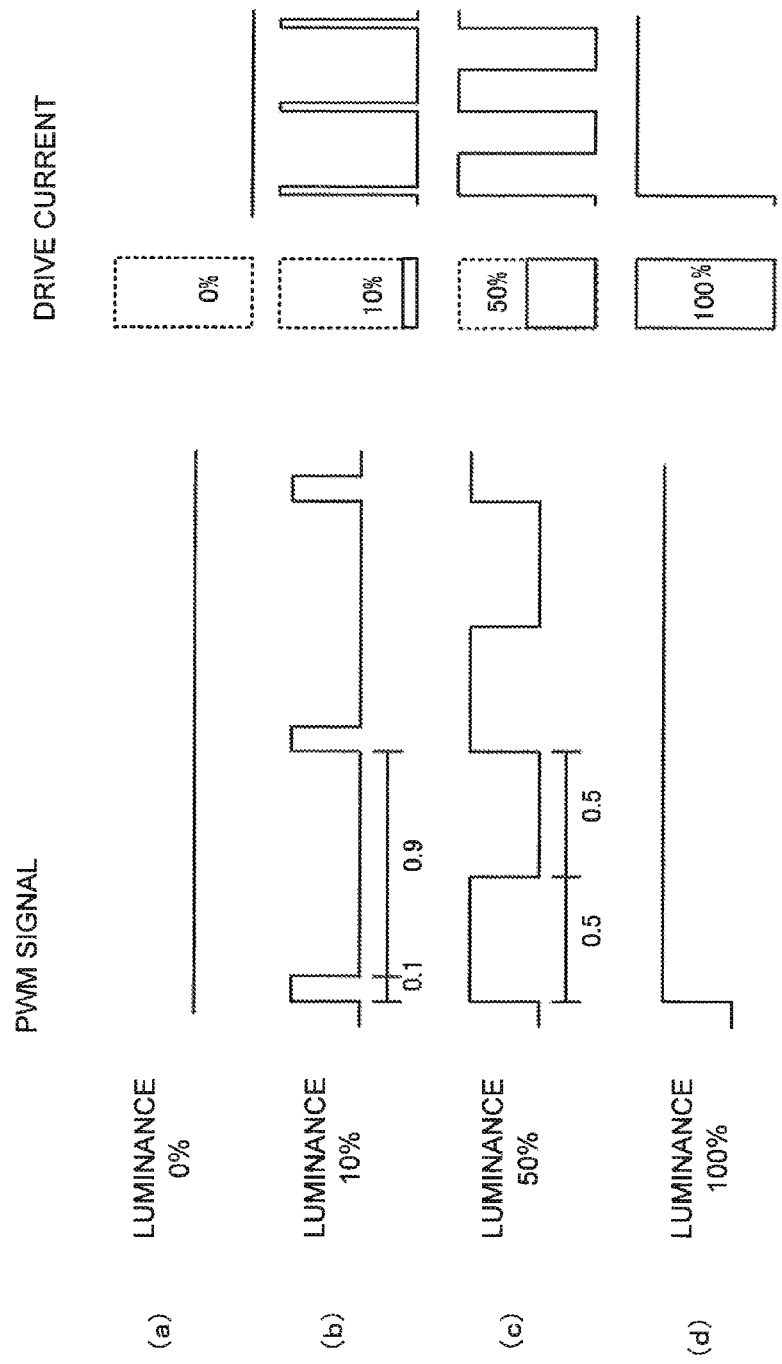

DRIVER CIRCUIT FOR LED BACKLIGHT OF LIQUID CRYSTAL DISPLAY DEVICE

RELATED APPLICATIONS

The present application claims priority to Japanese Application Number 2013-089598, filed Apr. 22, 2013, the disclosure of which is hereby incorporated by reference herein in its entirety.

BACKGROUND OF THE INVENTION

1. Field of the Invention

The present invention relates to a driver circuit that controls lighting of an LED backlight of a liquid crystal display device.

2. Description of the Related Art

In a case where a cold-cathode tube (CCFL) is used as a backlight of a liquid crystal display device, a high voltage is necessary for driving the CCFL. For this reason, as illustrated in FIG. 4, an inverter circuit is used for driving the backlight.

As backlights of liquid crystal display devices, more and more LEDs are used. In an LED backlight system, a driver circuit is necessary as a current source used for driving the LED. As a luminance adjustment system in such a case, a PWM system is mainly used. As illustrated in FIG. 5, a PWM signal is input from a control circuit to the driver circuit. The driver circuit controls a drive current for an LED in accordance with the PWM signal input from the control circuit. In one type of LED drive, an LED drive current value is changed and, in another type of LED drive, as illustrated in FIGS. 6A to 6D, PWM control for changing the duty ratio of the driving time is performed as in the case of a PWM signal input with a constant current value.

However, in the case of employing a method in which the backlight is used to have constant luminance without adjusting the luminance, in the conventional CCFL system, the luminance can be adjusted in accordance with the adjustment of an analog signal. However, in the case of the LED type, even in a case where the luminance configured to be constant, it is necessary to use a PWM circuit, which causes an increase in the cost.

SUMMARY OF THE INVENTION

In view of the foregoing circumstances, an object of the present invention is to provide a driver circuit for a backlight of a liquid crystal display device not requiring a PWM signal for adjusting the luminance in a case where the luminance control of an LED backlight is unnecessary.

A driver circuit according to the present invention for a backlight of a liquid crystal display device supplies a drive current to a backlight using an LED in accordance with a PWM signal used for controlling the amount of supply of the drive current supplied to the backlight using the LED. The driver circuit for a backlight of a liquid crystal display device includes: a determination unit to which the PWM signal is input and that determines whether or not a duty ratio of the PWM signal satisfies a predetermined value set in advance and outputs a luminance adjustment signal set in advance in a case where the input of the PWM signal does not reach the predetermined value or there is no input of the PWM signal and outputs a luminance adjustment signal corresponding to the input PWM signal in a case where the input of the PWM signal reaches the predetermined or more; and a drive current output unit that receives the luminance adjustment signal from the determination unit and supplies the drive current corresponding to the luminance adjustment signal to the backlight using the LED.

According to the present invention, by employing the configuration described above, a driver circuit for a backlight of a liquid crystal display device not requiring a PWM signal for adjusting the luminance in a case where the luminance control of an LED backlight is unnecessary can be provided.

BRIEF DESCRIPTION OF THE DRAWINGS

The above-described object, other objects, and features of the present invention will become more apparent by describing in detail exemplary embodiments thereof with reference to the attached drawings in which:

FIGS. 6A to 6D are diagrams that illustrate examples of a PWM signal input to a conventional driver circuit and a drive current output from the driver circuit.

DETAILED DESCRIPTION OF THE PREFERRED EMBODIMENTS

Figure 1:
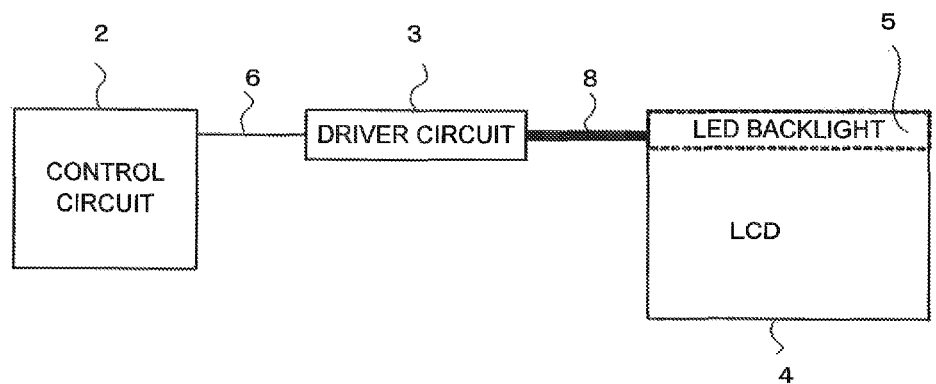
FIG. 1 is a diagram that illustrates a driver circuit for an LED backlight of a liquid crystal display.

In a driver circuit according to an embodiment of the present invention for an LED backlight of a liquid crystal display device, as illustrated in FIG. 1, a light source called an LED backlight 5 is arranged on the rear side of a liquid crystal display device 4. Since an LED has long life and low power consumption, it has replaced a conventional CCFL backlight light source. Generally, by connecting one or a plurality of column light sources, in which a plurality of LEDs are arranged in a row pattern, in parallel to each other, an LED backlight is configured.

Then, as a drive current is supplied to each column light source that is an LED backlight light source from a driver circuit 3, the LED backlight 5 is driven. At this time, the luminance of the LED backlight is adjusted by changing a drive current 8 driving the LEDs or by configuring the duty ratio between the On/Off periods of the LEDs to be changeable and performing PWM control for adjusting the brightness of the LEDs.

Figure 2:
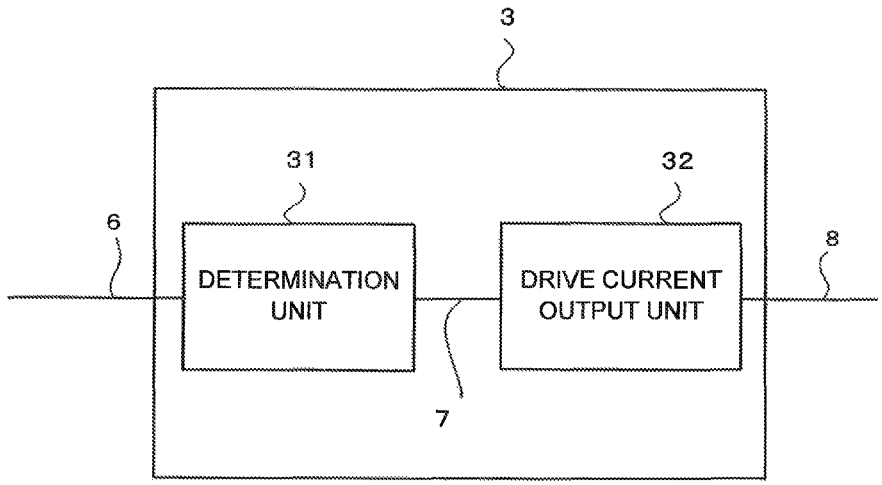
FIG. 2 is a diagram that illustrates the driver circuit illustrated in FIG. 1.

FIG. 2 is a diagram that illustrates the driver circuit illustrated in FIG. 1. The driver circuit 3 includes: a determination unit 31; and a drive current output unit 32. A PWM signal is input to the determination unit 31 from a control circuit 2. The determination unit 31 detects the duty ratio of the PWM signal input from the control circuit 2. Here, in a case where the control circuit 2 is not connected to the driver circuit 3, in other words, the control circuit 2 and the determination unit 31 are not electrically connected to each other and the determination unit 31 is open-circuited, the duty ratio is detected to be zero, in other words, 0%.

The determination unit 31 compares the detected duty ratio and a predetermined value of the duty ratio set in advance. When the detected duty ratio does not reach the predetermined value of the duty ratio that is set in advance, the determination unit 31 outputs a luminance adjustment signal 7 set in advance to the drive current output unit 32 such that the LED backlight emits light at a luminance level set in advance. On the other hand, when the detected duty ratio is the predetermined value of the duty ratio set in advance or more, the determination unit 31 outputs a luminance adjustment signal 7 corresponding to the PWM signal input from the control circuit 2 to the drive current output unit 32. For example, the determination unit 31 obtains time averaged level of the PWM signal 6 input from the control circuit 2 and compares the time averaged level of the average PWM signal with the predetermined value set in advance. The luminance adjustment signal 7 transmitted from the determination unit 31 to the drive current output unit 32 may be, an analog signal, a reconverted PWM signal, a signal via bus line, or the like.

The drive current output unit 32 outputs the drive current 8 corresponding to the luminance adjustment signal 7, which is input from the determination unit 31, to the LED backlight 5. The drive current output unit 32 generates an output current used for driving the LED backlight 5 based on the input luminance adjustment signal 7. An analog system that adjusts the amount of current or a method for outputting the drive signal as a PWM signal may be utilized to control the drive current 8.

Figure 3:
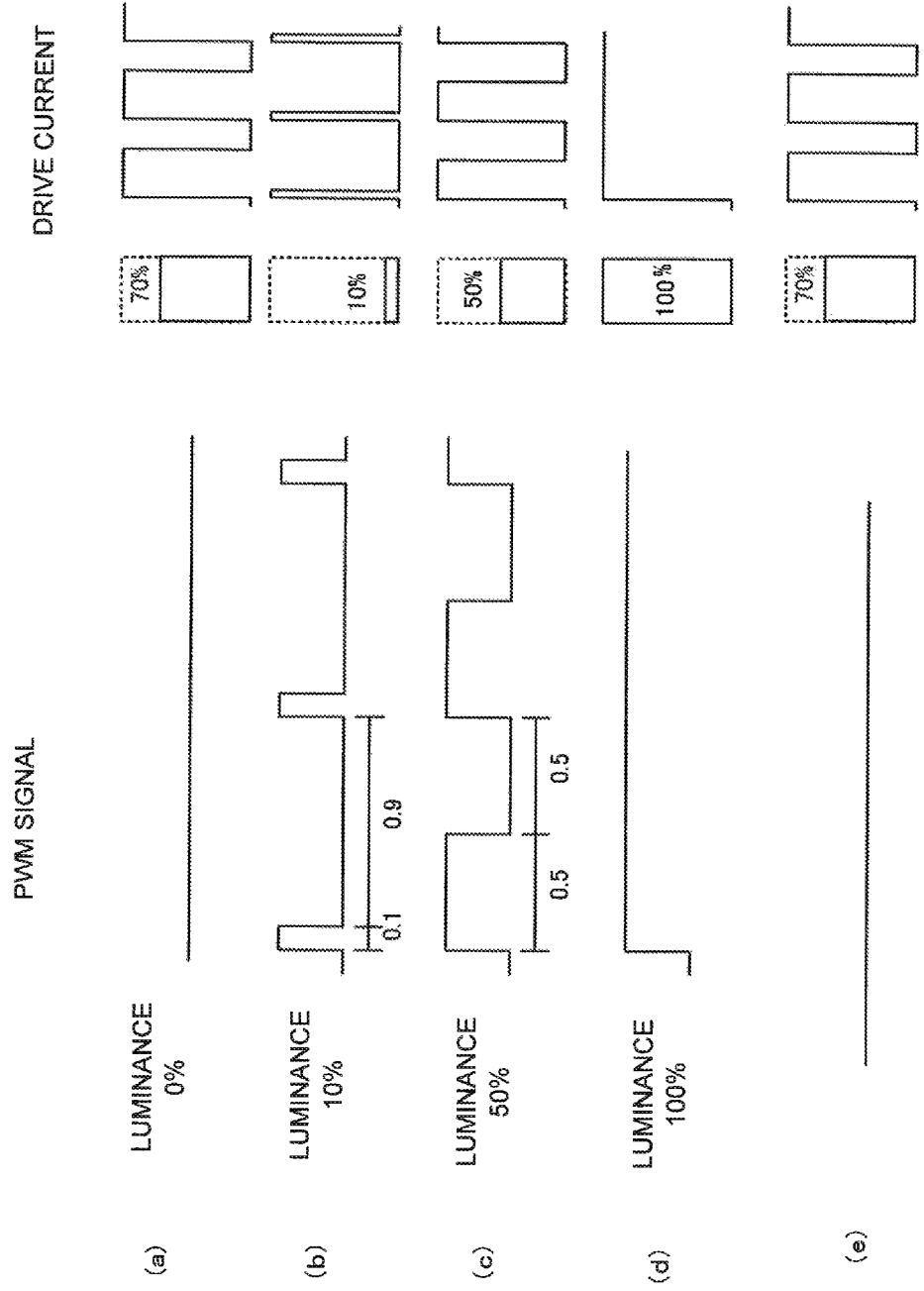
FIGS. 3A to 3E are diagrams that illustrate a relation between an input of the driver and an output thereof, in other words, a drive current of the LED backlight.
Figure 4:
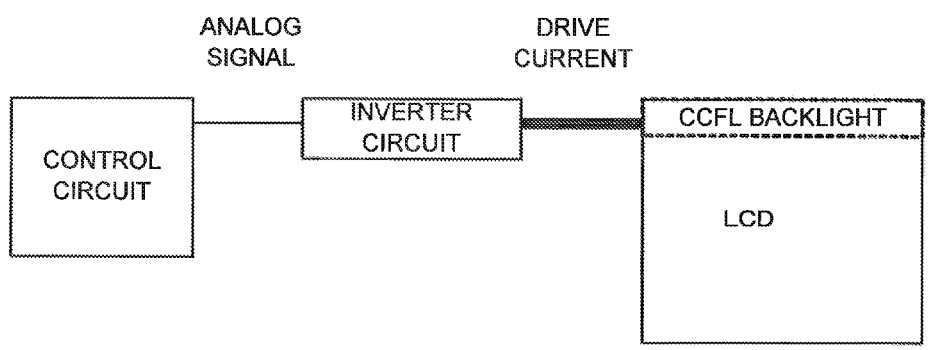
FIG. 4 is a diagram that illustrates a luminance adjusting system for a backlight of a CCFL of a liquid crystal display device using a conventional inverter circuit.
Figure 5:
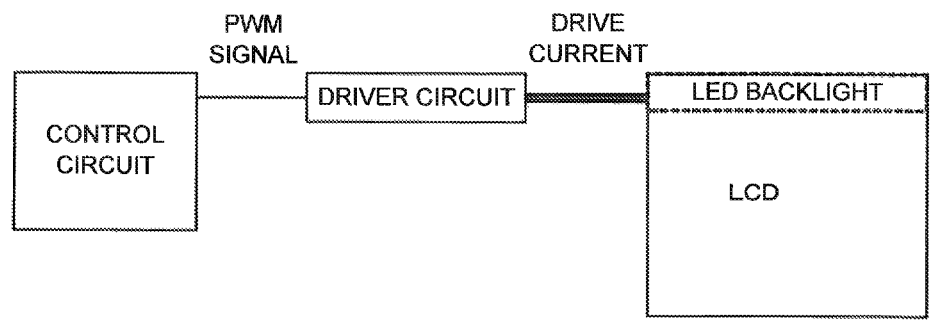
FIG. 5 is a diagram that illustrates a luminance adjusting system for an LED backlight of a liquid crystal display device using a conventional driver circuit.

FIGS. 3A to 3E are diagrams that illustrate a relation between an input of the driver circuit, for an LED backlight of a liquid crystal display device and an output thereof, in other words, a drive current of the LED backlight, according to an embodiment of the present invention. In a case where the predetermined value of the duty ratio set in advance to be 5%, as illustrated in FIG. 3A, when the duty ratio of the PWM signal input to the determination unit 31 is 0%, the duty ratio of the PWM signal does not reach the predetermined value, and accordingly, the determination unit 31 outputs a luminance adjustment signal 7 for which the LED backlight 5 is at a luminance level of 70% set in advance to the drive current output unit 32.

As illustrated in FIGS. 3B to 3D, in a case where the duty ratio of the PWM signal input to the determination unit 31 is the predetermined value of 5% set in advance or more, the luminance adjustment signal 7 for which the LED backlight 5 emits light with luminance corresponding to the PWM signal input from the control circuit 2 is output from the determination unit 31 to the drive current output unit 32. In addition, as illustrated in FIG. 3E, when a PWM signal is not input to the driver circuit 3, in other words, when the driver circuit 3 is open, the duty ratio is detected to be 0%, and accordingly, a luminance adjustment signal 7 for which the LED backlight 5 emits light with the luminance set in advance, in other words, 70% is output from the determination unit 31 to the drive current output unit 32.

The invention claimed is:

1. A driver circuit for an LED backlight of a liquid crystal display device, the driver circuit configured to supply a drive current to the LED backlight, which has an LED, in accordance with a PWM signal used for controlling an amount of the drive current supplied to the LED backlight, the driver circuit comprising:
    a determination unit configured
        to receive the PWM signal,
        to determine whether or not a duty ratio of the PWM signal exceeds a predetermined value set in advance,
        to output a first luminance adjustment signal set in advance when the duty ratio of the PWM signal is below the predetermined value or when there is no input of the PWM signal, and
        to output a second luminance adjustment signal corresponding to the input PWM signal when the duty ratio of the PWM signal exceeds the predetermined value; and
    a drive current output unit configured,
        when the determination unit outputs the first luminance adjustment signal,
            to receive the first luminance adjustment signal from the determination unit, and
            to supply the drive current corresponding to the first luminance adjustment signal to the LED backlight, and
        when the determination unit outputs the second luminance adjustment signal,
            to receive the second luminance adjustment signal from the determination unit, and
            to supply the drive current corresponding to the second luminance adjustment signal to the LED backlight.

2. The driver circuit according to claim 1, wherein, when the determination unit is open-circuited, the duty ratio of the PWM signal is determined to be zero.

3. The driver circuit according to claim 1, wherein the determination unit is configured to obtain a time-averaged level of the PWM signal and to compare the time-averaged level with the predetermined value to determine whether or not the duty ratio of the PWM signal exceeds the predetermined value.

4. The driver circuit according to claim 1, wherein the luminance adjustment signal includes at least one of an analog signal, a reconverted PWM signal, or a signal via a bus line.

* * * * *